United States Patent
Wan et al.

(10) Patent No.: US 9,804,367 B2
(45) Date of Patent: Oct. 31, 2017

(54) WAFER-LEVEL HYBRID COMPOUND LENS AND METHOD FOR FABRICATING SAME

(71) Applicant: OmniVision Technologies, Inc., Santa Clara, CA (US)

(72) Inventors: Tsung-Wei Wan, Hsinchu (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 49 days.

(21) Appl. No.: 14/932,368

(22) Filed: Nov. 4, 2015

(65) Prior Publication Data

US 2017/0123190 A1    May 4, 2017

(51) Int. Cl.
| | | |
|---|---|---|
| *G02B 9/00* | (2006.01) | |
| *G02B 27/10* | (2006.01) | |
| *G02B 13/00* | (2006.01) | |
| *B29D 11/00* | (2006.01) | |
| *G02B 1/04* | (2006.01) | |

(52) U.S. Cl.
CPC .... *G02B 13/0085* (2013.01); *B29D 11/00307* (2013.01); *B29D 11/00403* (2013.01); *G02B 13/005* (2013.01); *B29K 2995/0029* (2013.01); *G02B 1/041* (2013.01)

(58) Field of Classification Search
CPC .. G02B 13/0085; G02B 13/005; G02B 1/041; B29D 11/00403; B29D 11/00307; B29K 2995/0029
See application file for complete search history.

(56) References Cited

U.S. PATENT DOCUMENTS

| | | | |
|---|---|---|---|
| 8,427,748 B2 | 4/2013 | Yamada et al. | |
| 8,599,301 B2 | 12/2013 | Dowski, Jr. et al. | |
| 2004/0106223 A1 | 6/2004 | Kaneko et al. | |
| 2006/0044450 A1* | 3/2006 | Wolterink | G02B 13/006 |
| | | | 348/340 |

(Continued)

FOREIGN PATENT DOCUMENTS

| | | |
|---|---|---|
| CN | 1490635 A | 4/2004 |
| CN | 102016653 B | 7/2013 |

OTHER PUBLICATIONS

Taiwan Patent Application No. 105132576 English translation of Office Action dated Apr. 18, 2017; 3 pages.

*Primary Examiner* — Alicia M Harrington
(74) *Attorney, Agent, or Firm* — Lathrop Gage LLP

(57) ABSTRACT

A hybrid compound lens includes a substrate lens and a resin lens. The substrate lens has a non-planar substrate surface surrounded by a flange having a flange surface bordering the non-planar substrate surface and forming an obtuse angle therewith. The resin lens has a non-planar resin surface adjoining the substrate lens along the non-planar substrate surface. A lens wafer includes a substrate wafer and resin lenses. The substrate wafer has a top surface having non-planar surface features each bordered by a planar region of the top surface and forming an obtuse angle therewith. Each resin lens has a non-planar resin surface adjoining the substrate wafer along a non-planar surface feature. A method for fabricating a wafer-level hybrid compound lens includes depositing a resin portion on a non-planar feature of a side of a substrate. The method also includes forming the resin portion into a lens on the non-planar feature.

15 Claims, 8 Drawing Sheets

(56) References Cited

U.S. PATENT DOCUMENTS

| | | | |
|---|---|---|---|
| 2007/0221826 A1* | 9/2007 | Bechtel | G02B 3/005 250/208.1 |
| 2010/0208354 A1 | 8/2010 | Okazaki et al. | |
| 2010/0290123 A1 | 11/2010 | Yamada et al. | |
| 2011/0215342 A1 | 9/2011 | Oliver | |
| 2012/0140340 A1 | 6/2012 | Duparré et al. | |
| 2012/0229908 A1 | 9/2012 | Kintz et al. | |

* cited by examiner

WAFER-LEVEL HYBRID COMPOUND LENS AND METHOD FOR FABRICATING SAME

BACKGROUND

Wafer-level manufacture of camera modules manufactured with complementary metal-oxide semiconductor (CMOS) technologies has contributed to the incorporation of camera modules in high-volume consumer products such as mobile devices and motor vehicles.

FIG. 1 shows a wafer-level lens 100 incorporated into a camera module 192 of a mobile device 190. FIG. 2 is a cross-sectional view of a prior-art lens 200 that is an example of wafer-level lens 100. Prior art lens includes two planar substrates 211, 212, and resin lenses 221-224. A spacer 231 separates planar substrates 211 and 212. Lens 200 has a height 202. Planar substrate 212 is on a spacer 232 such that lens 200 may be positioned above an image sensor, not shown, of camera module 192.

Lens 200 has several disadvantages. Shapes of resin lenses 221-224 have limited accessible thicknesses and curvatures because larger thicknesses and curvatures contribute to lower replication yields. Planar substrates 211 and 212 have respective thicknesses 241 and 242. Resin lenses 221-224 have respective maximum thicknesses 243-246. Thicknesses 243-246 place a lower limit on height 202. For example, thicknesses 244 and 245 place a lower limit on a distance 204 between planar substrates 211 and 212. If lens 200 is used in mobile device 190, thicknesses 243-246 place a lower limit on the thickness of camera module 192, and hence constrains how thin mobile device 190 can be.

SUMMARY OF THE INVENTION

In one embodiment, a hybrid compound lens is disclosed. The hybrid compound lens includes a substrate lens and a resin lens. The substrate lens has a first non-planar substrate surface surrounded by a flange having a flange surface bordering the first non-planar substrate surface. The flange surface forms an obtuse angle with the first non-planar substrate surface. The resin lens has a first non-planar resin surface that adjoins the substrate lens along the first non-planar substrate surface.

In another embodiment, a hybrid compound lens wafer is disclosed. The hybrid compound lens wafer includes a substrate wafer and a plurality of resin lenses. The substrate wafer has a top surface having a plurality of first non-planar surface features. Each first non-planar surface feature is bordered by a planar region of the top surface that forms an obtuse angle with the first non-planar surface feature. Each of the plurality of resin lenses has a first non-planar resin surface that adjoins the substrate wafer along a respective one of the plurality of the first non-planar features.

In another embodiment, a method for fabricating a wafer-level hybrid compound lens is disclosed. The method includes depositing a first resin portion on a first non-planar feature of a first side of a substrate. The method also includes forming the first resin portion into a first lens on the first non-planar feature.

DETAILED DESCRIPTION OF THE EMBODIMENTS

Figure 1:
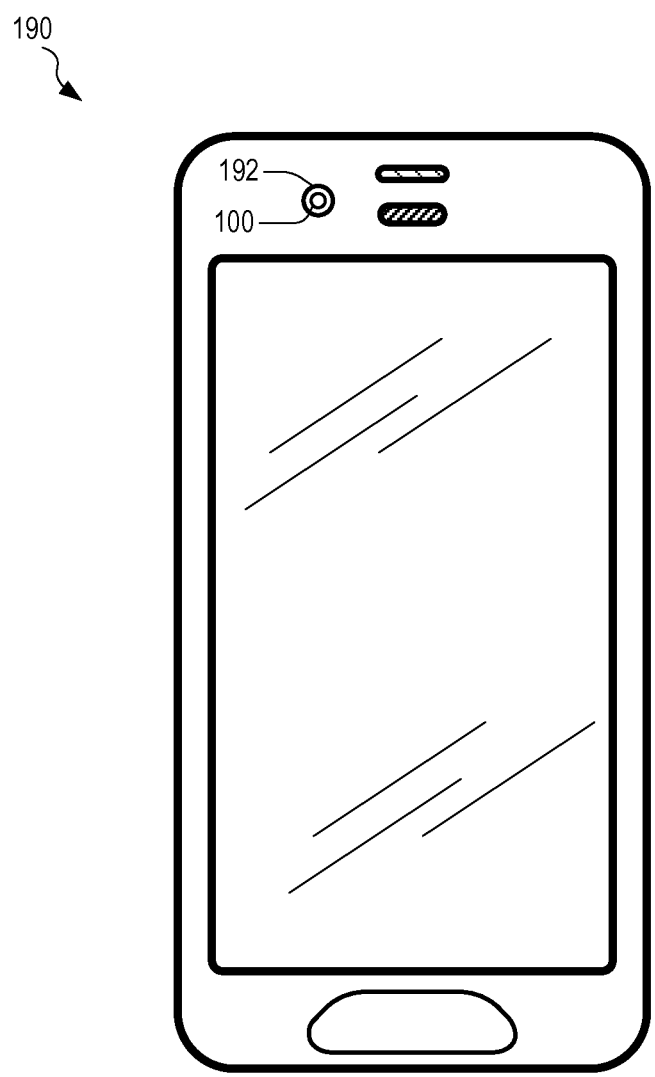
FIG. 1 shows a wafer-level lens incorporated into a camera module of a mobile device.
Figure 2:
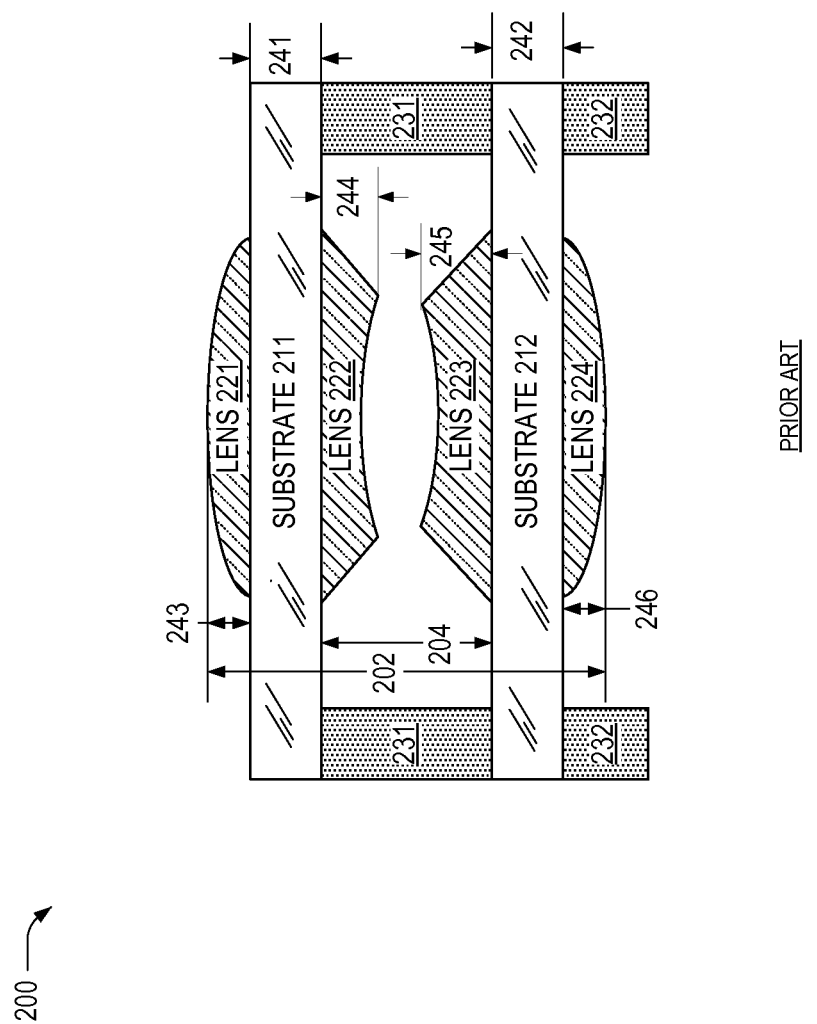
FIG. 2 is a cross-sectional view of a prior-art lens that is an example of the wafer-level lens of FIG. 1.
Figure 3:
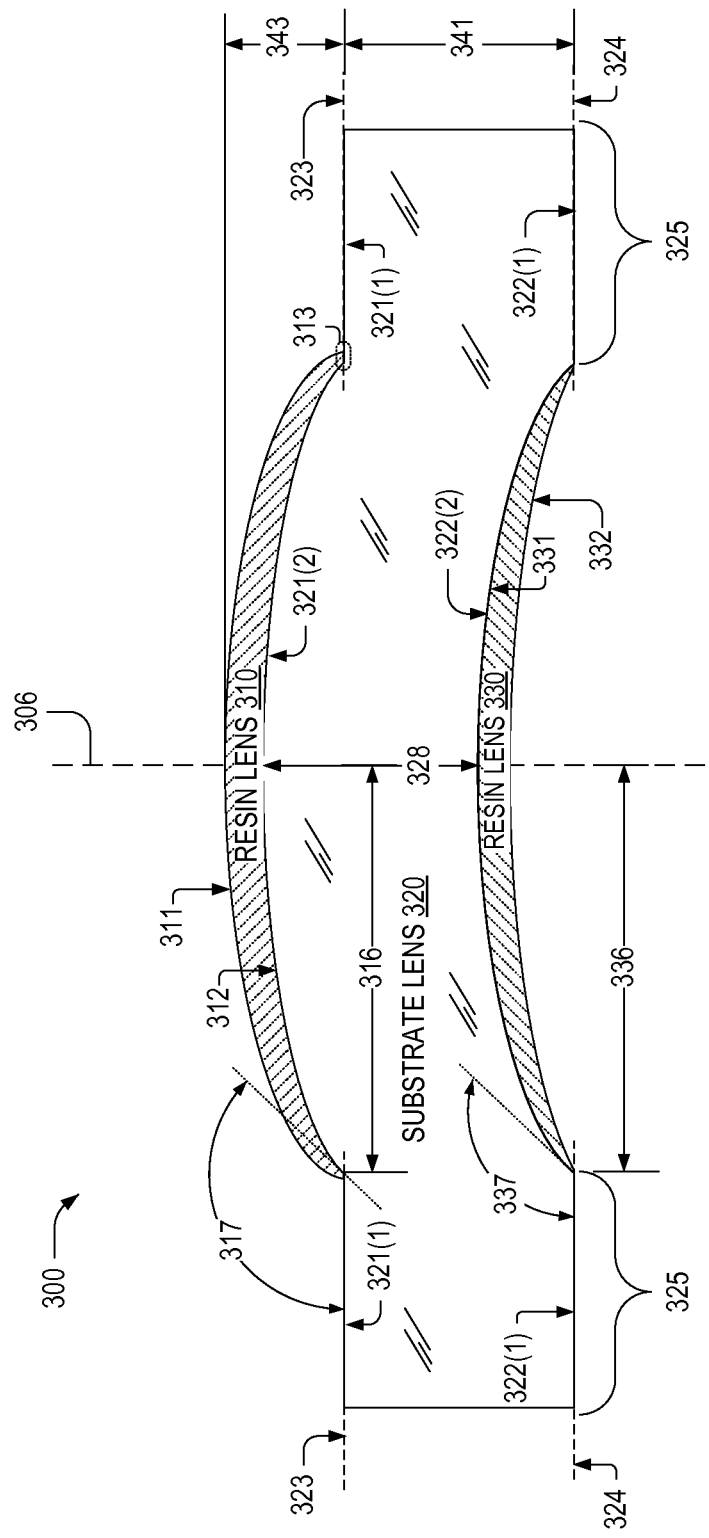
FIG. 3 is a cross-sectional view of a wafer-level hybrid compound lens that may function as the wafer-level lens of FIG. 1, in an embodiment.

FIG. 3 is a cross-sectional view of a wafer-level hybrid compound lens 300 that may function as the wafer-level lens 100 in mobile device 190. Wafer-level hybrid compound lens 300 includes a substrate lens 320 and resin lenses 310 and 330, which are each a meniscus lens. Substrate lens 320 has a top surface 321 and a bottom surface 322. Top surface 321 includes surfaces 321(1, 2) where surface 321(1) is planar and surface 321(2) is non-planar. Bottom surface 322 includes surfaces 322(1, 2) where surface 322(1) is planar and surface 322(2) is non-planar. Resin lens 310 has non-planar surfaces 311 and 312. Resin lens 330 has non-planar surfaces 331 and 332. Non-planar surface 312 of resin lens 310 adjoins surface 321(2) of substrate lens 320. Similarly, non-planar surface 331 of resin lens 330 adjoins surface 322(2) of substrate lens 320.

Substrate lens 320 includes a flange 325 that has an edge thickness 341. Flange 325 includes surfaces 321(1) and 322(1), which may also be denoted as flange surfaces. Resin lens 310 has a maximum height 343 above surface 321(1). Non-planar surface 311 of resin lens 310 may be entirely on one side of surface 321(1). For example, surface 321(1) may be planar and reside in a plane 323 such that resin lens 310 may be entirely on one side of plane 323. Non-planar surface 332 of resin lens 330 may be entirely on one side of a plane 324 that includes surface 322(1). A portion of one or both resin lens 310 and resin lens 330 may extend onto flange 325 without departing from the scope hereof. For example, a portion of resin lens 310 in region 313 is on surface 321(1) of flange 325.

Substrate lens 320 has an optical axis 306. At least one of resin lenses 310 and 330 are coaxial with substrate lens 320. Substrate lens 320 has a center thickness 328 that may exceed maximum height 343 of resin lens 310. Center thickness 328 may be less than maximum height 343 without departing from the scope hereof.

Surface 321(2) meets surface 321(1) at a radius 316 from optical axis 306. At this location, surfaces 321(1) and 321(2) meet at a non-reflex angle 317. Non-reflex angle 317 may exceed ninety degrees such that it is an obtuse angle. Surface 322(2) meets surface 322(1) at a radius 336 from optical axis 306. At this location, surfaces 322(1) and 322(2) meet at a non-reflex angle 337. Non-reflex angle 337 may exceed ninety degrees such that it is an obtuse angle.

Substrate lens 320 may be formed of glass, plastic, or other materials known in the art. Resin lenses 310 and 330 may be formed of an ultraviolet-curable epoxy. Resin lenses 310 and 330 may be either formed of the same material or of different materials.

Surface 321(2) of substrate lens 320 may be spherical, in which case non-planar surface 312 of resin lens 310 is also spherical and surfaces 321(2) and 312 have respective radii of curvature of equal absolute value. Alternatively, surface 321(2) may be aspherical, in which case non-planar surface 312 is also aspherical and surfaces 321(2) and 312 have the same surface profile, such as a radially-symmetric profile (about optical axis 306) characterized by aspheric coefficients, a conic constant, and a radius of curvature. Surface 322(2) of substrate lens 320 may be spherical, in which case non-planar surface 331 of resin lens 310 is also spherical and surface 322(2) and 331 have respective radii of curvature of equal absolute value. Alternatively, surface 322(2) may be aspherical, in which case non-planar surface 331 is also aspherical and surface 322(2) and surface 331 have the same surface profile.

In an embodiment, wafer-level hybrid compound lens 300 includes resin lens 310 and does not include resin lens 330. In this embodiment, each surface 322(1, 2) may be planar. In a different embodiment, wafer-level hybrid compound lens 300 includes resin lens 330 and does not include resin lens 310. In this embodiment, each surface 321(1, 2) may be planar.

Figure 4:
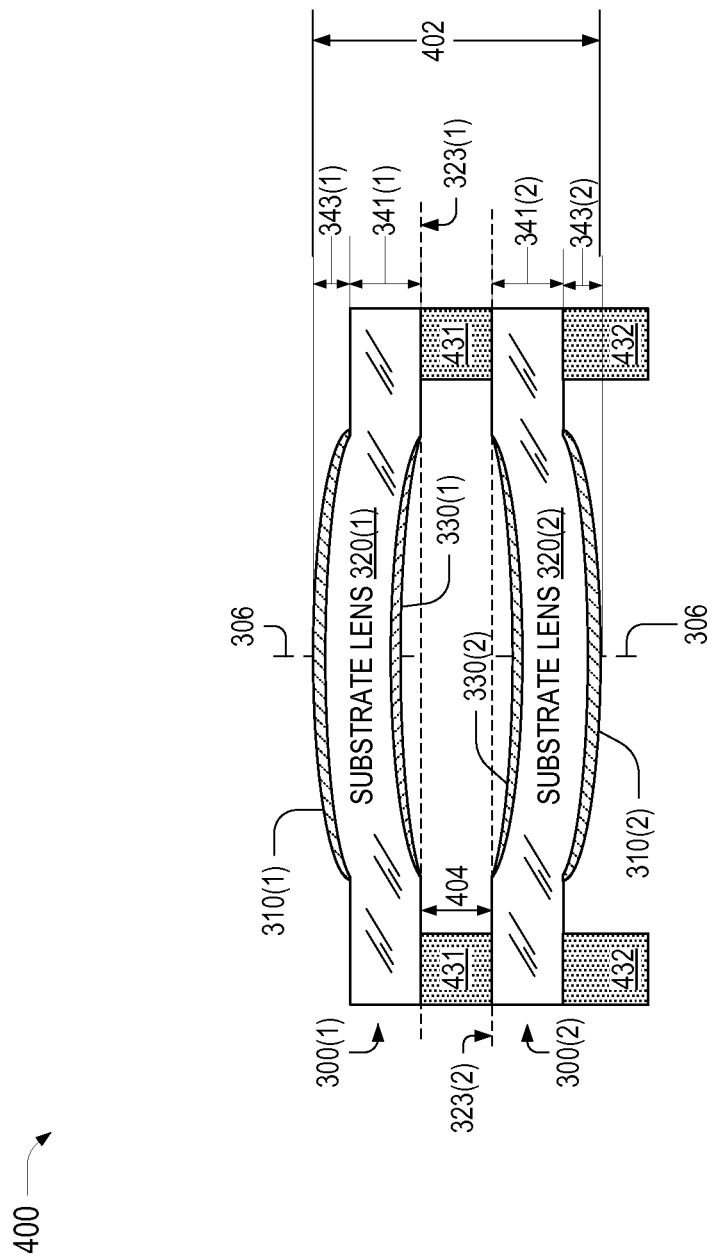
FIG. 4 is a cross-sectional view of a stacked wafer-level hybrid compound lens that includes two wafer-level hybrid compound lenses of FIG. 3, in an embodiment.

FIG. 4 is a cross-sectional view of a stacked wafer-level hybrid compound lens 400. Stacked wafer-level hybrid compound lens 400 includes two coaxial wafer-level hybrid compound lenses 300(1) and 300(2) separated by a distance 404 and having a spacer 431 therebetween. Stacked wafer-level hybrid compound lens 400 has a height 402 between respective exterior surfaces of resin lenses 310(1) and 310(2) along common optical axis 306.

Resin lenses 330(1) and 330(2) may be entirely on one side of planes 323(1) and 323(2), respectively. In such a case, distance 404 has a minimum value that is unconstrained by a thickness of either resin lens 330(1) and 330(2). In a limiting case, spacer 431 includes only bonding layer between planar surfaces of substrate lens 320(1) and 320(2), such that distance 404 equals the bonding layer thickness. Compared to prior-art lens 200, this lack of constraint on distance 404 allows height 402 to be smaller than height 202 of prior-art lens 200.

Figure 5:
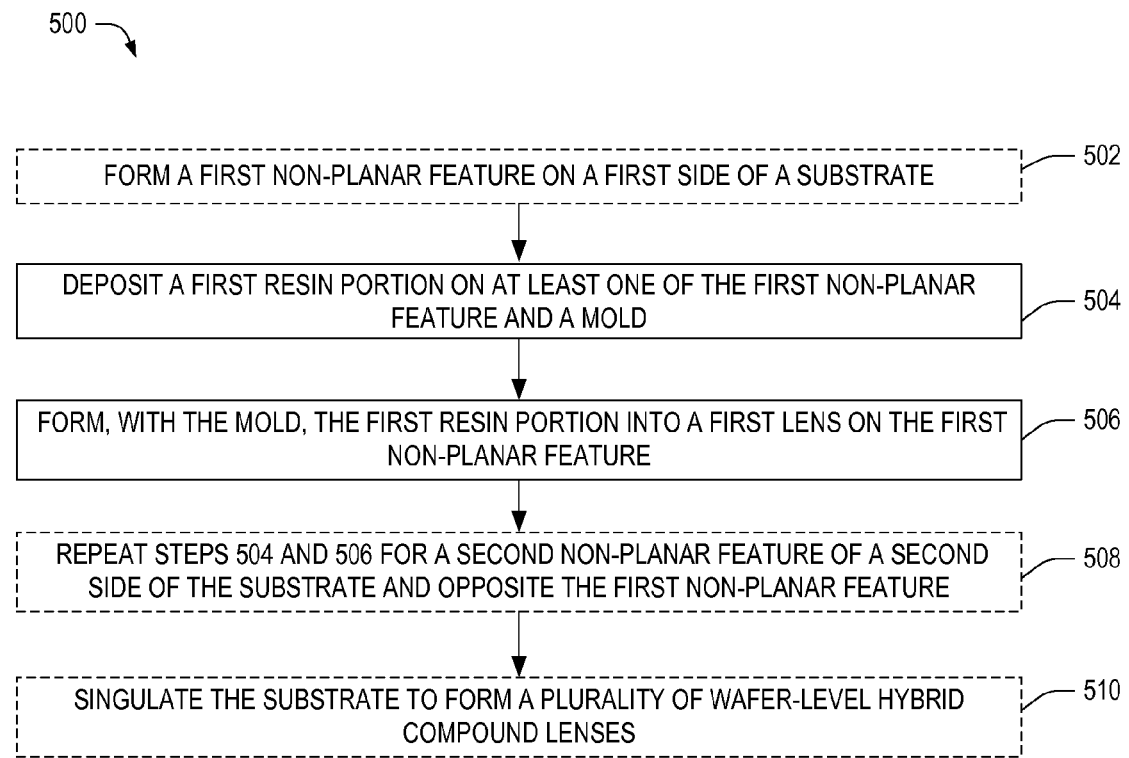
FIG. 5 is a flowchart illustrating an exemplary method for fabricating the wafer-level hybrid compound lens of FIG. 3.
Figure 6:
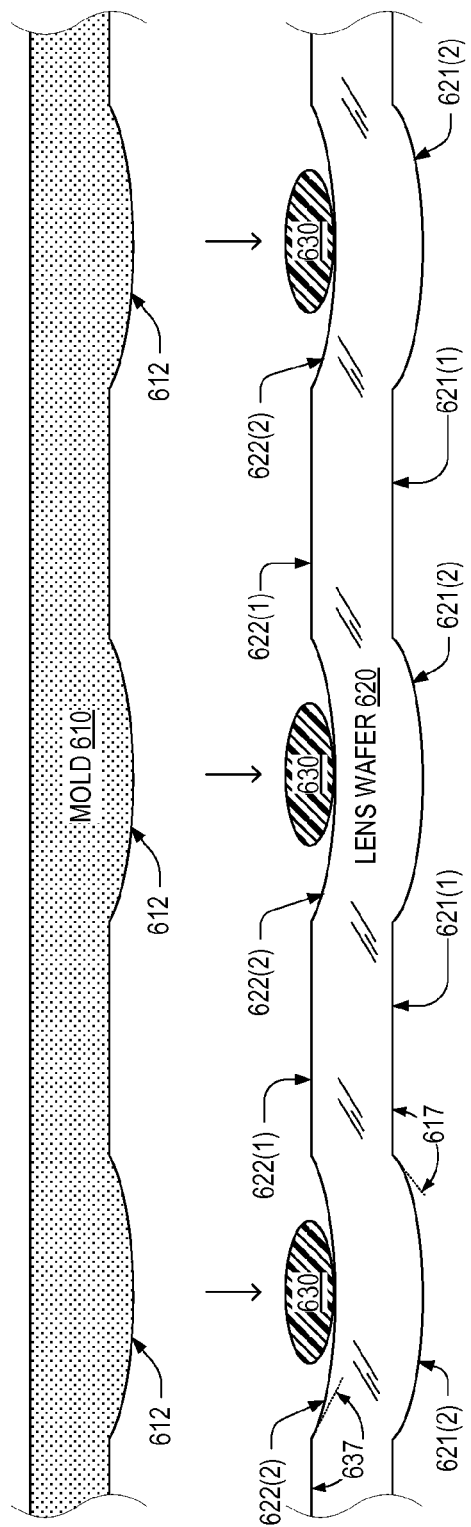
FIG. 6 is a cross-sectional view of a lens wafer having a plurality of first non-planar features each having a resin portion thereon, in an embodiment.
Figure 7:
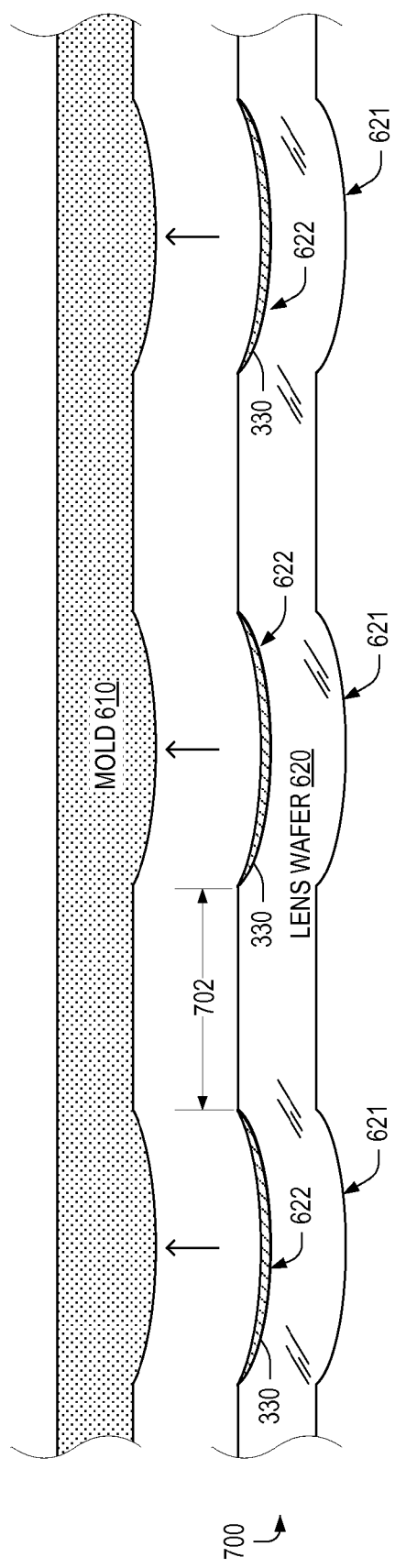
FIG. 7 is a cross-sectional view of the lens wafer of FIG. 6 having a resin lens formed in accordance with the method of FIG. 5, in an embodiment.
Figure 8:
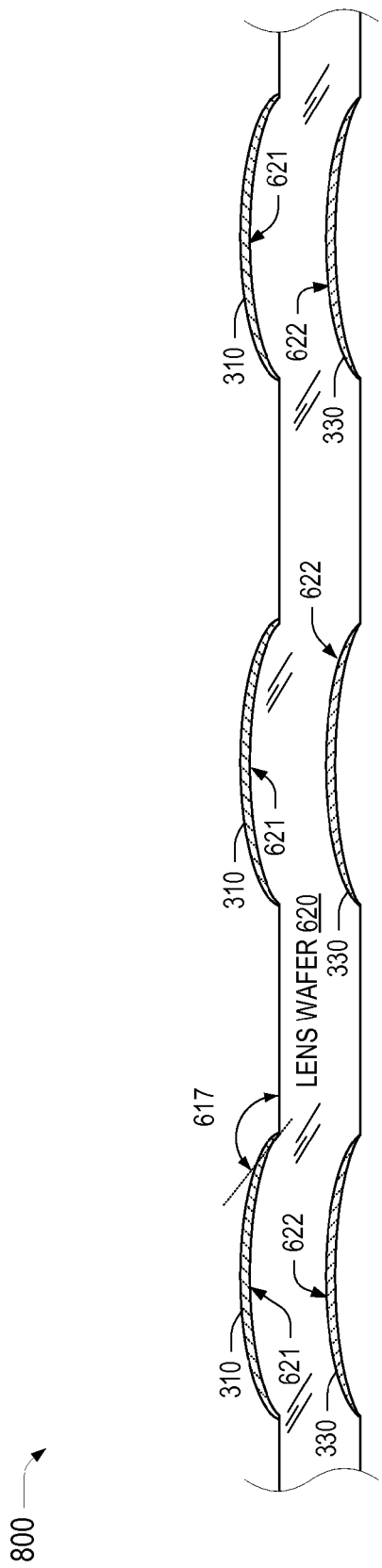
FIG. 8 is a cross-sectional view of the lens wafer of FIG. 7 having a resin lens formed on each of a plurality of second non-planar features, in accordance with the method of FIG. 5, in an embodiment.

FIG. 5 is a flowchart illustrating an exemplary method 500 for fabricating wafer-level hybrid compound lens 300. FIGS. 6-8 show cross-sectional views of a lens wafer, the views corresponding to steps of method 500. FIGS. 6-8 are best viewed together in the following description.

Step 502 is optional. In step 502, method 500 forms a first non-planar feature on a first side of a substrate. In an example of step 502, a plurality of non-planar features 621(2) and 622(2) are formed on a lens wafer 620, a portion of which is shown in FIG. 6. A surface 621(1) is between adjacent non-planar features 621(2). A surface 622(1) is between adjacent non-planar features 622(2). Features 621(2) and 622(2) are examples of top surface 321(2) and bottom surface 322(2), respectively, of wafer-level hybrid compound lens 300, FIG. 3. Surface 621(1) and non-planar feature 621(2) form a non-reflex angle 617 therebetween. Surface 622(1) and non-planar feature 622(2) form a non-reflex angle 637 therebetween. Non-reflex angle 617 and non-reflex angle 637 are examples of non-reflex angle 317 and non-reflex angle 337, respectively. Lens wafer 620 may include more than one hundred non-planar features 621(2) and 622(2).

In step 504, method 500 deposits a first resin portion on at least one of the first non-planar feature and a mold. In an example of step 504, a first resin portion 630 is deposited on at least one of (a) each non-planar feature 622(2) and (b) each of a plurality of non-planer surfaces 612 of mold 610. FIG. 6 illustrates one first resin portion 630 on each non-planar feature 622(2).

In step 506, method 500 forms, using the mold, the first resin portion into a first lens on the first non-planar feature. In an example of step 506, each first resin portion 630 is formed into a respective resin lens 330 using mold 610 to form a hybrid compound lens wafer 700, as shown in FIG. 7. In an embodiment, angle 637 exceeds ninety degrees, which facilitates, compared to smaller angles, removal of excess resin from resin portion 630 that is not formed into any of the resin lenses 330.

Adjacent resin lenses 330 are separated by an edge-to-edge distance 702 such that resin lenses 330 are noncontiguous on lens wafer 620. Alternatively, lens wafer 620 may have a contiguous resin layer thereon spanning a plurality of non-planar features 622(2). Hybrid compound lens wafer 700 may include more than one hundred resin lenses 330.

Step 508 is optional. In step 508, method 500 repeats steps 504 and 506 for a second non-planar feature of a second side of the substrate and opposite the first non-planar feature. In an example of step 508, resin lenses 310 are formed on non-planar features 621(2) of lens wafer 620 to form a hybrid compound lens wafer 800, as shown in FIG. 8. In an embodiment, non-reflex angle 617 exceeds ninety degrees, which facilitates, compared to smaller angles, removal of excess resin that is not formed into any of the resin lenses 310. Hybrid compound lens wafer 800 may include more than one hundred resin lenses 310.

Step 510 is optional and applies when the substrate is a lens wafer introduced in step 502 has a plurality of non-planar features, such as lens wafer 620, upon which a respectively plurality of resin lenses are formed. In step 510, method 500 singulates the substrate to form a plurality of wafer-level hybrid compound lenses. In an example of step 510, hybrid compound lens wafer 800 is singulated to form a plurality of wafer-level hybrid compound lenses 300. Surfaces 321(1) and 322(1) of hybrid compound lens 300 (FIG. 3) include a portion of surfaces 621(1) and 622(1) (FIG. 6), respectively.

Features described above as well as those claimed below may be combined in various ways without departing from the scope hereof. The following examples illustrate some possible, non-limiting combinations:

(A1) A hybrid compound lens includes a substrate lens and a resin lens. The substrate lens has a first non-planar substrate surface surrounded by a flange having a flange surface bordering the first non-planar substrate surface. The flange surface forms an obtuse angle with the first non-planar substrate surface. The resin lens has a first non-planar resin surface that adjoins the substrate lens along the first non-planar substrate surface (A2) In the hybrid compound lens denoted by (A1), the resin lens may be formed of an ultraviolet-curable resin.

(A3) In any hybrid compound lens denoted by one of (A1) and (A2), the resin lens may be a meniscus lens.

(A4) In any hybrid compound lens denoted by one of (A1) through (A3), the first non-planar substrate surface may be a spherical surface.

(A5) In any hybrid compound lens denoted by one of (A1) through (A4), the flange surface may be planar and in a flange-surface plane, and the entirety of the resin lens may be on one side of the flange-surface plane.

(A6) In any hybrid compound lens denoted by one of (A1) through (A5), the substrate lens may have a second non-planar substrate surface opposite the first non-planar substrate surface, and may further comprise a second resin lens having a second non-planar resin surface that adjoins the substrate lens along the second non-planar substrate surface.

(A7) In any hybrid compound lens denoted by one of (A1) through (A6), at least one of (a) the first non-planar substrate surface may be a spherical surface and (b) the second non-planar substrate surface may be a spherical surface.

(B1) A hybrid compound lens wafer includes a substrate wafer and a plurality of resin lenses. The substrate wafer has a top surface having a plurality of first non-planar surface features. Each first non-planar surface feature is bordered by a planar region of the top surface that forms an obtuse angle with the first non-planar surface feature. Each of the plurality of resin lenses has a first non-planar resin surface that adjoins the substrate wafer along a respective one of the plurality of the first non-planar features.

(B2) In the hybrid compound lens wafer denoted by (B1) resin lens may be formed of an ultraviolet-curable resin.

(B3) In any hybrid compound lens wafer denoted by one of (B1) and (B2), resin lens may be a meniscus lens.

(B4) In any hybrid compound lens wafer denoted by one of (B1) through (B3), the substrate wafer may have a bottom surface with a plurality of second non-planar surface features each opposite a respective one of the first non-planar surface features, and may further comprise a plurality of second resin lenses each having a second non-planar resin surface that adjoins the substrate wafer along a respective one of the plurality of second non-planar surface features.

(B5) In any hybrid compound lens wafer denoted by one of (B1) through (B4), at least one of (a) each first non-planar surface feature may be a spherical surface and (b) each second non-planar surface feature may be a spherical surface.

(C1) A method for fabricating a wafer-level hybrid compound lens includes depositing a first resin portion on a first non-planar feature of a first side of a substrate. The method also includes and forming the first resin portion into a first lens on the first non-planar feature.

(C2) In the method denoted by (C1), the substrate may include a flange region having a flange surface bordering the first non-planar feature and forming an obtuse angle with a top surface of the first non-planar feature.

(C3) Any method denoted by one of (C1) and (C2) may further include a step of forming the first non-planar feature.

(C4) In any method denoted by one of (C1) through (C3), (a) the first resin portion may be one of a plurality of first resin portions, (b) the first non-planar feature may be one of a plurality of non-planar features, and (c) the first lens may be one of a plurality of first lenses. In a case when aforementioned scenarios (a), (b), and (c) apply, the step of depositing may further comprise depositing each of the plurality of first resin portions on a respective one of the plurality of non-planar features on the first side of the substrate; and the step of forming may further comprise forming each of the plurality of first resin portions into one of the plurality of first lenses.

(C5) In any method denoted by one of (C1) through (C4), each one of the plurality of first lenses may be noncontiguous with respect to the remaining plurality of first lenses.

(C6) Any method denoted by one of (C1) through (C4) may further include steps of (a) depositing a second resin portion on a second non-planar feature of a second side of the substrate and opposite the first non-planar feature; and (b) a step of forming the second resin portion into a second lens on the second non-planar feature.

(C7) Any method denoted by (C6) may further include a step of forming the second non-planar feature.

(C8) In any method denoted by one of (C6) and (C7), (a) the second resin portion may be one of a plurality of second resin portions, (b) the second non-planar feature may be one of a plurality of second non-planar features, and (c) the second lens may be one of a plurality of second lenses. In a case when aforementioned scenarios (a), (b), and (c) apply, the step of depositing may further include depositing each of the plurality of second resin portions on a respective one of the plurality of second non-planar features on the second side of the substrate. The step of forming may further include forming each of the plurality of second resin portions into one of the plurality of second lenses.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A hybrid compound lens comprising:
   a substrate lens having a (i) first non-planar substrate surface surrounded by a flange having a flange surface bordering the first non-planar substrate surface, the flange surface forming an obtuse angle with the first non-planar substrate surface, and (ii) a second non-planar substrate surface opposite the first non-planar substrate surface;
   a first meniscus resin lens having a first non-planar resin surface that adjoins the substrate lens along the first non-planar substrate surface; and
   a second meniscus resin lens having a second non-planar resin surface that adjoins the substrate lens along the second non-planar substrate surface.

2. The hybrid compound lens of claim 1, the first meniscus resin lens being formed of an ultraviolet-curable resin.

3. The hybrid compound lens of claim 1, the first non-planar substrate surface being a spherical surface.

4. The hybrid compound lens of claim 1, the flange surface being planar and in a flange-surface plane, the entirety of the first meniscus resin lens being on one side of the flange-surface plane.

5. The hybrid compound lens of claim 1, at least one of (a) the first non-planar substrate surface being a spherical surface and (b) the second non-planar substrate surface being a spherical surface.

6. A hybrid compound lens wafer comprising:
   a substrate wafer with (i) a top surface having a plurality of first non-planar surface features, each first non-planar surface feature bordered by a planar region of the top surface that forms an obtuse angle with the first non-planar surface feature, and (ii) a bottom surface having a plurality of second non-planar surface features each opposite a respective one of the first non-planar surface features; and
   a plurality of first meniscus resin lenses each having a first non-planar resin surface that adjoins the substrate wafer along a respective one of the plurality of first non-planar surface features,
   a plurality of second meniscus resin lenses each having a second non-planar resin surface that adjoins the substrate wafer along a respective one of the plurality of second non-planar surface features.

7. The hybrid compound lens wafer of claim 6, each of the plurality of first meniscus resin lens being formed of an ultraviolet-curable resin.

8. The hybrid compound lens wafer of claim 6, at least one of (a) each first non-planar surface feature being a spherical surface and (b) each second non-planar surface feature being a spherical surface.

9. A method for fabricating a wafer-level hybrid compound lens comprising:
depositing a first resin portion on a first non-planar feature of a first side of a substrate; and
forming, with a mold, the first resin portion into a first meniscus lens on the first non-planar feature;
depositing a second resin portion on a second non-planar feature of a second side of the substrate and opposite the first non-planar feature; and
forming the second resin portion into a second meniscus lens on the second non-planar feature.

10. The method of claim 9, the substrate including a flange region having a flange surface bordering the first non-planar feature and forming an obtuse angle with a top surface of the first non-planar feature.

11. The method of claim 9, further comprising forming the first non-planar feature.

12. The method of claim 9, the first resin portion being one of a plurality of first resin portions, the first non-planar feature being one of a plurality of non-planar features, and the first meniscus lens being one of a plurality of first meniscus lenses,
the step of depositing further comprising depositing each of the plurality of first resin portions on a respective one of the plurality of non-planar features on the first side of the substrate; and
the step of forming further comprising forming each of the plurality of first resin portions into one of the plurality of first meniscus lenses.

13. The method of claim 12, each one of the plurality of first meniscus lenses being noncontiguous with respect to the remaining plurality of first meniscus lenses.

14. The method of claim 9, further comprising forming the second non-planar feature.

15. The method of claim 9, the second resin portion being one of a plurality of second resin portions, the second non-planar feature being one of a plurality of second non-planar features, and the second meniscus lens being one of a plurality of second meniscus lenses,
the step of depositing further comprising depositing each of the plurality of second resin portions on a respective one of the plurality of second non-planar features on the second side of the substrate; and
the step of forming further comprising forming each of the plurality of second resin portions into one of the plurality of second meniscus lenses.

* * * * *